TRANSMITTER

INVENTOR
E. F. BROWN
BY R. O. Nimz
ATTORNEY

Jan. 14, 1969 E. F. BROWN 3,422,227

DUAL CODE DIFFERENTIAL ENCODING SCHEME FOR VIDEO SIGNALS

Filed Sept. 30, 1965 Sheet 2 of 4

FIG. 2 RECEIVER

United States Patent Office 3,422,227
Patented Jan. 14, 1969

3,422,227

DUAL CODE DIFFERENTIAL ENCODING SCHEME FOR VIDEO SIGNALS

Earl F. Brown, Piscataway Township, Middlesex County, N.J., assignor to Bell Telephone Laboratories, Incorporated, New York, N.Y., a corporation of New York Filed Sept. 30, 1965, Ser. No. 491,528
U.S. Cl. 179—15.55 15 Claims
Int. Cl. H04b *1/66*

ABSTRACT OF THE DISCLOSURE

A system for the transmission and reception of pulse coded video information at reduced bandwidth through the use of a dual coding scheme is disclosed. This system transmits small changes in video signals by means of differential encoding and transmits larger changes in the video signals by means of expanded codes transmitted during idle periods in the video signals.

This invention relates to pulse code communication systems and, more particularly, to the transmission of pulse coded information at reduced bandwidth.

A great number of schemes have heretofore been proposed for reducing the bandwidth required to transmit video information. Among these there is a system known as differential encoding in which the differences between successive samples, rather than the samples themselves, are quantized, encoded and transmitted. Since these differences vary much less, on the average, than do the signal samples themselves, a smaller number of quantizing levels are needed for their accurate representation, and hence a smaller number of digits are used for the transmission of these levels. One such system is disclosed in C. C. Cutler Patent 2,605,361, issued July 24, 1952.

The average video frame is made up of large areas of slowly changing intensity level and small areas of rapidly changing intensity levels. While the differential encoding scheme described above is fully adequate for encoding the large areas of slowly changing intensity, the large amplitude discontinuities at the contours of objects are more difficult to encode. Since differential encoding inherently has less amplitude discrimination capabilities than conventional pulse code modulation, these contours present an especially difficult encoding problem. The differential encoder usually requires more than one difference to encompass a large amplitude change. As a result, edges of objects in the reproduced picture are blurred and, even worse, successive lines do not register and "broken contours" and "edge twinkle" are produced. These effects are very notice able at the subjective level. Several schemes for transmitting additional contour information are found in R. E. Graham Patent 3,026,375, issued Mar. 20, 1962, S. C. Kitsopoulos Patent 3,071,727, issued Jan. 1, 1963, and F. W. Mounts Patent 3,090,008, issued May 14, 1963.

It is an object of the present invention to reduce the bandwidth necessary to transmit video information while retaining sharp contour recognition.

It is a more specific object of the invention to increase the accuracy of differential encoding schemes at large amplitude changes.

It is another object of the invention to transmit smaller changes in video signals by means of differential encoding and to transmit larger changes in the video signals by means of expanded codes transmitted during idle periods in the video signals.

In accordance with the present invention, these and other objects are achieved by means of a dual or expanded coding scheme. Differential samples are, for example, encoded in an $n$ digit code. One or more of these $n$ digit codes, however, is set aside as a flag or marker code. When the differential sample exceeds a preselected threshold, the marker code is transmitted. Simultaneously, the differential sample is further encoded in an $m$ digit code which further extends the coding range beyond the threshold level. These extended range codes are stored and transmitted during the horizontal retrace time. At the receiver, the $n$-codes are delayed for a full line and recombined with the corresponding $m$-codes to provide accurate representations of picture contours.

It will be noted that the differential codes, or $n$-codes, can be selected to accurately reproduce only the gradual tonal changes in the picture content. A three or four digit code is entirely adequate for this purpose. The $m$-code, on the other hand, can be selected to accurately reproduce the sharpest amplitude discontinuity likely to be encountered. In this way, all of the advantages of differential encoding are preserved while its major disadvantage is overcome. In addition, the bandwidth required for transmitting the split code signal is no greater than that required for the differential code itself since the $m$-codes are transmitted during otherwise idle channel time.

The expanded or $m$-codes may themselves be differential codes, expanding the range of the $n$-codes, or may be conventional amplitude-representing codes, or may be combinations of both. Conventional amplitude-representing codes have the advantage of correcting accumulated errors in the differential system. Differential codes on the other hand, inherently require fewer digits for their adequate representation.

These and other objects and features, the nature of the present invention and its various advantages, will be more readily understood upon consideration of the attached drawings and of the following detailed description of the drawings.

Figure 1:
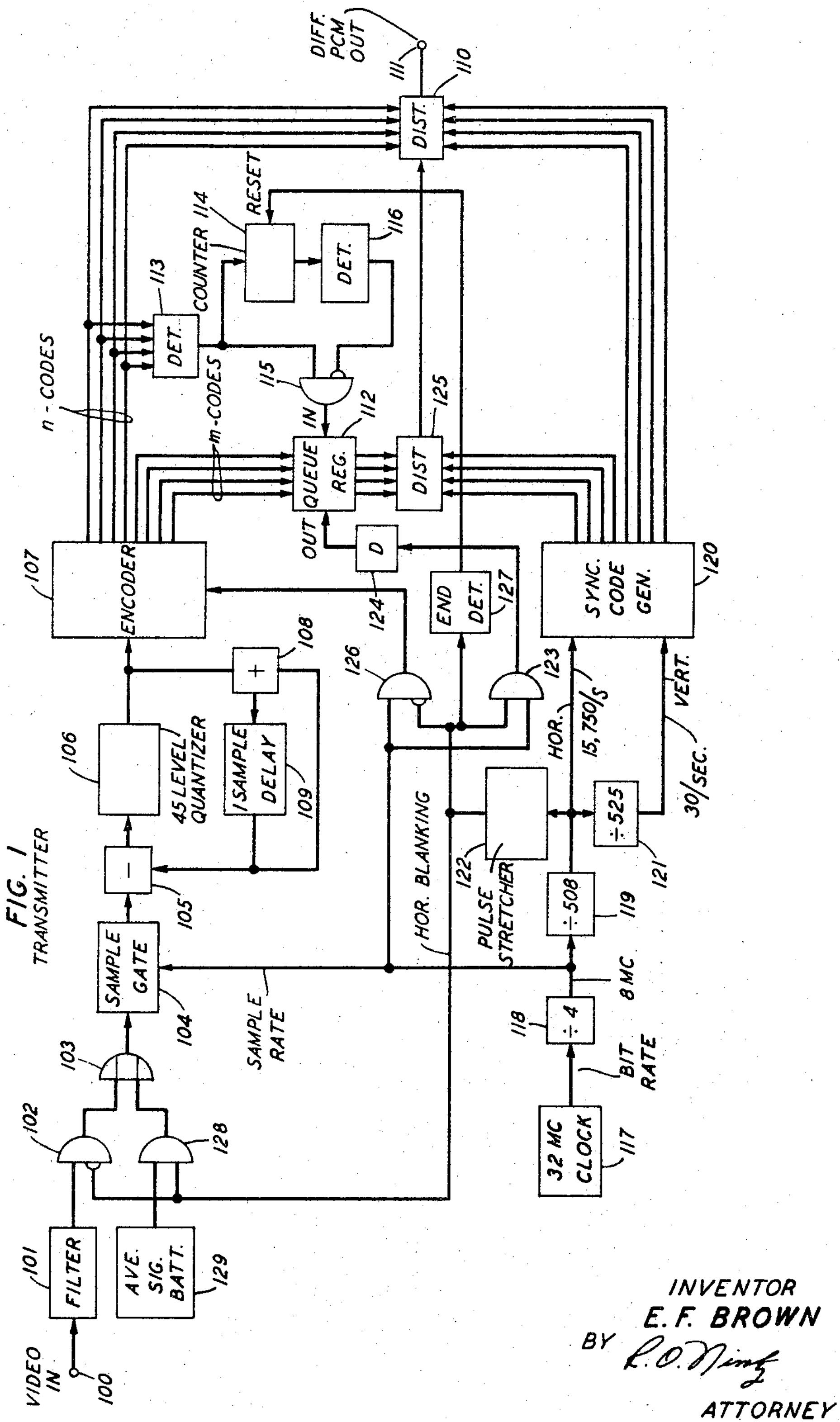
FIG. 1 is a schemaitc block diagram of the transmitter for a differential-differential split code video transmission system in accordance with the present invention.

Referring more particularly to FIG. 1, there is shown a detailed block diagram of a pulse code modulation transmitter in accordance with the present invention. The transmitter of FIG. 1 comprises an analog video input terminal 100 to which video information is applied. This video information is band-limited by low pass filter 101 and applied by way of inhibit gate 102 and OR gate 103 to sampling gate 104. Gate 104 is operated at the sampling rate of eight megacycles and thus provides at its output amplitude-modulated samples at an eight megacycle rate. The output of sampling gate 104 is supplied to analog subtracting circuit 105.

Analog subtracting circuit 105 derives the algebraic difference between the two signals applied to its inputs and provides this difference at its output. This output is supplied to quantizing circuit 106. Quantizing circuit 106 quantizes the amplitude of the sample delivered to its input into one out of forty-five discrete amplitude levels. The output of quantizer 106 is simultaneously applied to encoding circuit 107 and analog adding circuit 108.

Analog adding circuit 108 is a circuit of the type which derives the algebraic sum of the two analog signals present at its input terminals and supplies this sum at its output. The output of adding circuit 108 is applied to delay line 109, having a delay equal to the period between successive samples. The output of delay line 109 is applied to the remaining input of subtracting circuit 105 and the remaining input of adding circuit 108.

It can be seen that adding circuit 108 accumulates the sum of the successive quantized differences generated by subtracting circuit 105. This accumulation is used as a prediction of the next sample value. The predicted sample value is compared in subtracting circuit 105 with the actual sample amplitude and the difference, or error signal, is quantized in quantizer 106 and encoded in encoding circuit 107.

Encoder 107 is arranged to generate codes in accordance with the values given in Table I.

TABLE I

| Amp. diff. | n-Codes | m-Codes |
|---|---|---|
| +22 | 1111 | 1111 |
| +21 | 1111 | 1110 |
| +20 | 1111 | 1101 |
| +19 | 1111 | 1100 |
| +18 | 1111 | 1011 |
| +17 | 1111 | 1010 |
| +16 | 1111 | 1001 |
| +15 | 1111 | 1000 |
| +14 | 1111 | 0111 |
| +13 | 1111 | 0110 |
| +12 | 1111 | 0101 |
| +11 | 1111 | 0100 |
| +10 | 1111 | 0011 |
| +9 | 1111 | 0010 |
| +8 | 1111 | 0001 |
| +7 | 1111 | 0000 |
| +6 | 1110 | |
| +5 | 1101 | |
| +4 | 1100 | |
| +3 | 1011 | |
| +2 | 1010 | |
| +1 | 1001 | |
| 0 | 0000 | |
| −1 | 0001 | |
| −2 | 0010 | |
| −3 | 0011 | |
| −4 | 0100 | |
| −5 | 0101 | |
| −6 | 0110 | |
| −7 | 0111 | 0000 |
| −8 | 0111 | 0001 |
| −9 | 0111 | 0010 |
| −10 | 0111 | 0011 |
| −11 | 0111 | 0100 |
| −12 | 0111 | 0101 |
| −13 | 0111 | 0110 |
| −14 | 0111 | 0111 |
| −15 | 0111 | 1000 |
| −16 | 0111 | 1001 |
| −17 | 0111 | 1010 |
| −18 | 0111 | 1011 |
| −19 | 0111 | 1100 |
| −20 | 0111 | 1101 |
| −21 | 0111 | 1110 |
| −22 | 0111 | 1111 |

It will be noted that encoder 107 generates two different sets of four-digit codes. These have been termed *n*-codes and *m*-codes, respectively. If the amplitude differences to be encoded remain within the range between plus and minus six, only the four digits of the *n*-code are required to fully determine the sample difference. If, however, the amplitude differences are greater than plus six or less than minus six, the *n*-code becomes a "flag" and the *m*-codes are used to define the amplitude differences between the values plus seven and plus twenty-two and minus seven and minus twenty-two. The flag code "1111" signifies an amplitude difference having a positive sign and exceeding six in amplitude. Similarly, the flag code "0111" signifies an amplitude difference having a negative sign and exceeding the magnitude six. It will be noted that the flag codes "1111" and "0111" have been selected to permit easy identification of these codes. Moreover, they have been selected to differ only in the first digit. Hence, any code having three ones in the three least significant digit positions can be considered a flag code and the most significant digit used to determine the sign.

Returning to FIG. 1, the *n*-codes are applied directly to a parallel-to-series pulse distributor 110 which converts these parallel digits to a serial pulse train and applies this train to output terminal 111. The four digit *m*-codes, on the other hand, are applied to a queuing register 112. Queue register 112 is a multidigit register having a capacity for storing a plurality of *m*-codes in the sequence in which they are generated. The number of *m*-codes which must be stored in queue register 112 depends upon the probabilities of the amplitude differences exceeding an absolute magnitude of six. Each sample exceeding this magnitude generates a flag code on the *n*-code leads which is applied to flag code detector 113. Detector 113 detects this flag code and provides an output which is applied directly to counter circuit 114 and, by way of inhibit gate 115, to queue register 112. An output from inhibit gate 115 enables a single *m*-code to be entered in queue register 112. At the same time, all previously entered *m*-codes are advanced in register 112 to provide room for the new code.

Counter 114 counts the number of flag codes detected by detector 113 and, when this number is equal to the total capacity of queue register 112, provides an output which is detected by detecting circuit 116. Detecting circuit 116 provides an output to disable inhibit gate 115 and thus prevent the entry of any further *m*-codes into queue register 112. The circuits is arranged, of course, such that queue register 112 normally provides adequate storage capacity for all the *m*-codes generated in one line of video information. In accordance with the present invention, these *m*-codes are transmitted during the horizontal retrace interval following each line of video information.

To this end, a clock pulse source 117 produces clock pulses at the output bit rate of 32 megacycles. These clock pulses are applied to divider circuit 118 to provide pulses at the sampling rate of eight megacycles. The eight megacycle clock pulse train is applied to divider circuit 119 to provide pulses at the horizontal line rate of 15,750 pulses per second. These horizontal pulses are applied to synchronizing code generator 120 which generates an eight-digit horizontal synchronizing code. It will be noted on Table I that the code "1000" has not been used as an *n*-code. This code has been reserved for synchronizing purposes. Hence, when this code appears in the *n*-code position following the "0000" code, the receiver interprets this sequence as an horizontal synchronizing signal.

The output of divider circuit 119 is also applied to divider circuit 121 which divides this horizontal pulse train by 525 to provide vertical synchronizing pulses at the rate of thirty pulses per second. These vertical synchronizing pulses are applied to synchronizing code generator 120 which generates a unique vertical synchronizing code. This comprises the code "1000" repeated twice in succession. This code is interpreted at the receiver as a vertical synchronizing signal.

The output of divider circuit 119 is also applied to pulse stretching circuit 112. Stretching circuit 122 stretches the horizontal synchronizing signal for a period equal to the horizontal blanking period. In most video systems, this horizontal blanking period is approximately equal to fifteen percent of the total horizontal line interval. This period, of course, is the time required for the scanning beam of the display tube to return from the right-hand side of the display back to the left-hand side to begin tracing a new line. In accordance with the present invention, this horizontal retrace time is utilized to increase the transmission capacity of the transmission channel over which the pulse coded video information is sent.

The output of pulse stretcher 122 is applied to AND gate 123 along the pulses at the sampling rate. Thus, AND gate 123 passes sampling pulses only during the horizontal retrace time. These pulses are delayed by delay line 124 for a sufficient length of time to allow the synchronizing signals to clear *m*-code distributing circuit 125. They are then applied to queue register 112 to successively advance the *m*-codes out of register 112 to distributor 125. Thus, the *m*-codes are transmitted immediately following the synchronizing code during the retrace interval. In this connection, it will be noted that once each field a vertical retrace occurs which is substantially longer than the horizontal retrace time, the initial portion of this retrace interval is utilized in the same manner as the horizontal retrace interval to permit the transmission of the *m*-codes for the last line of the preceding field.

The output of pulse stretcher circuit 122 is also applied to disable inhibit gate 126 and thus prevent the encoding of sampling pulses in encoder 107. Encoder 107 is therefore disabled during the horizontal retrace time to prevent the generation of codes during this interval.

The output of pulse stretcher 122 is also applied to detecting circuit 127 which detects the end of the horizontal blanking period and supplies a pulse at this time to reset counter 114. Counter 114 is therefore prepared to count the *m*-codes in the next succeeding line.

Since the sample amplitude at the end of a horizontal line bears no necessary relationship to the sample amplitude at the beginning of the next succeeding line, the prediction scheme utilized between successive samples in the transmitter of FIG. 1 is not suitable for predicting the signal value at the beginning of each line. Instead, the horizontal blanking signal provided by pulse stretcher 122 is applied to disable inhibit gate 102 and enable AND gate 128. AND gate 128 applies a fixed signal from battery 129 through OR gate 103 to sample gate 104. The magnitude of the signal provided by battery 129 is equal to the expected average long term signal level. This average is subsituted for the actual signal value during the horizontal retrace time. At the beginning of the next line, the differential encoder therefore generates differential codes using this average value as the initial prediction.

It can be seen that the transmitter of FIG. 1 encodes video information into a four bit differential code and, furthermore, provides an expanded coding range by transmitting additional digits during the horizontal retrace time. Since the errors arising from the use of differential encoding are greatest when the sample amplitude have large differences, it is on just these occasions that the four-digit differential code is supplemented by means of an additional four digits transmitted during the horizontal retrace time. In this way, the coding scheme implemented by the transmitter of FIG. 1 retains the major advantage of differential encoding, that is, a smaller bandwidth requirement. At the same time, the major disadvantages of differential encoding, that is, large errors when sample differences become large, are avoided.

The various clock rates noted in FIG. 1 are the rates utilized by conventional broadcast television. These rates are only illustrative and should not be taken in a limiting sense. Similarly, the number of digits in the *n*-codes and *m*-codes are merely illustrative. The transmitters could easily be devices utilizing different numbers of digits for these codes. Moreover, the *n*-codes and *m*-codes need not have the same number of digits. The numbers actually used depend upon the range of amplitude differences which must be encoded and the fineness of quantization required.

Figure 2:
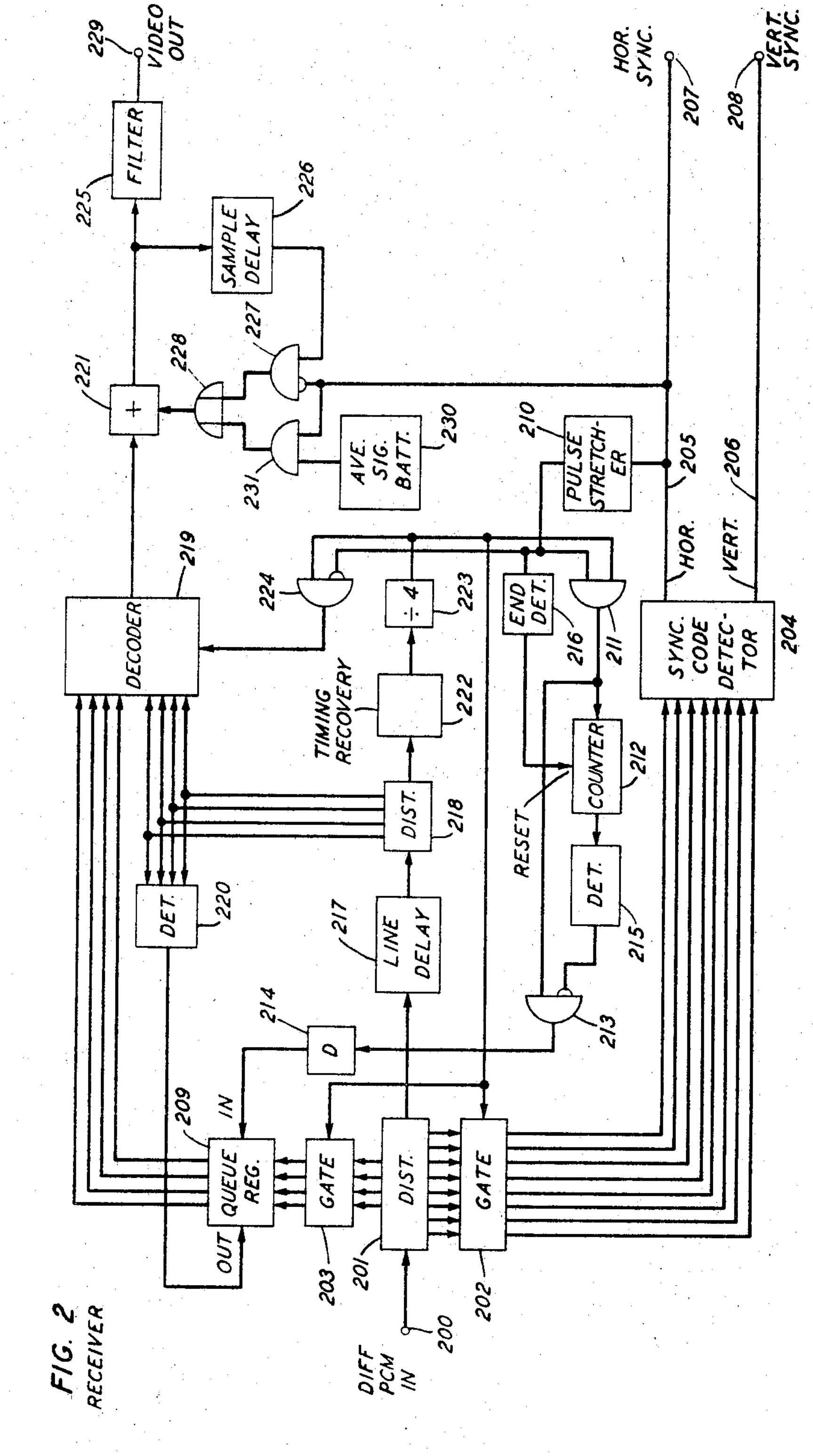
FIG. 2 is a schematic block diagram of a receiver suitable for use with the transmitter of FIG. 1.

In FIG. 2 there is shown a detailed block diagram of a pulse code modulation receiver suitable for receiving the information coded by the transmitter of FIG. 1. The serial pulse train generated by the transmitter of FIG. 1, after being transmitted over any well-known transmission medium, is applied to input terminal 200. This serial pulse train is applied to pulse distributor 201 which may comprise a tapped delay line which converts the serial pulse train into parallel form. The parallel pulse groups are applied to sampling gates 202 and 203.

It will be noted that a group of eight successive digits are applied to gate 202 while only four successive digits are applied to gate 203. The output of gate 202 is applied to synchronizing code detector 204 and these eight digits tested for the synchronizing code sequences. When a horizontal synchronizing code is detected, an output pulse appears on lead 205. Similarly when a vertical synchronizing code is detected, an output pulse appears on lead 206. These synchronizing pulses are applied to synchronizing terminals 207 and 208, respectively, and are utilized by a display device, not shown, to generate the required scanning sequences.

The output of gate circuit 203 is applied to queue register 209. As may be suspected, queue register 209 corresponds to queue register 112 in FIG. 1 and serves to store the expanded codes received during the horizontal blanking period. To this end, the horizontal synchronizing pulse on lead 205 is applied to pulse stretcher 210 which extends this pulse over substantially the entire horizontal blanking period. This blanking pulse is then applied to AND gate 211 to allow clock pulses at the sampling rate to be applied to counter circuit 212 and to inhibit gate 213. The clock pulses passed by inhibit gate 213 are delayed for one sampling interval in delay line 214 and applied to queue register 209 to shift the expanded codes into register 209. As before, these codes are queued in the exact order in which they are received.

Counter circuit 212 is similar to counter circuit 114 in FIG. 1 and counts expanded *m*-codes until detector circuit 215 detects a count equal to the total capacity of queue register 209. At this time, detector circuit 215 produces an output to disable inhibit gate 213 and prevent the further application of sampling clock pulses. At the end of the horizontal blanking period, detecting circuit 216 produces an output pulse which is applied to reset counter 212 and thus prepare counter 212 for the next cycle of operation.

The input pulse train applied to distributor 201 is applied to delay line 217 after traversing distributor 201. Delay line 217 has a delay exactly equal to the period required for scanning one line and retracing to the initial edge. The output of delay line 217 is applied to distributor 218 which, like distributor 201, translates this input serial pulse train into parallel groups of digits. These digits are applied to decoder circuit 219 as well as detector circuit 220.

Due to the presence of delay line 217, the *n*-codes supplied by distributor 218 corresponds to the same line as the *m*-codes previously stored in queue register 209. Detector circuit 220, like detector 113 in FIG. 1, detects each flag code and produces an output which steps one *m*-code out of queue register 209.

The *n*-codes are successively applied to decoder 219 from distributor 218. When any of these *n*-codes is a flag code, the corresponding *m*-code is delivered by queue register 209 to decoder 219. Decoder 219 performs the inverse operation of encoder 107 in FIG. 1. That is, decoder 219 translates the input codes into amplitude modulated pulse samples having a magnitude and sign corresponding to the code values shown in Table I. These amplitude modulated samples are applied to analog adding circuit 221.

The clock pulses required by the receiver of FIG. 2 are supplied by synchronizing recovery and framing circuit 222 to which the output distributor 218 is applied. Recovery circuit 222 delivers output pulses at the serial pulse rate to dividing circuit 223. Circuit 223 divides these pulses by four to provide at its output clock pulses at the sampling rate. These sampling clock pulses are simultaneously applied to AND gate 211 and inhibit gate 224 as well as to gates 202 and 203. The output of pulse stretcher 210 is also applied to AND gate 211 and inhibit gate 224. Thus, during the horizontal blanking period, AND gate 211 is enabled and inhibit gate 224 is disabled. During the balance of the line period, however, inhibit gate 224 is enabled and AND gate 211 disabled. Inhibit gate 224 delivers clock pulses at the sampling rate to decoder 219 to permit the decoding of the applied *m*-codes and *n*-codes.

The output of adding circuit 221 is simultaneously applied to low pass filter circuit 225 and delay line 226. Delay line 226 has a delay equal to the period between samples and supplies its output, by way of inhibit gate 227 and OR gate 228, to the remaining input of adding circuit 221. It can therefore been seen that the sum of the successive differences supplied by decoder 219 is circulated in the loop including delay line 226 and incremented on each pass at adding circuit 221 by the new output of decoder 219. This sum is delivered to filter circuit 225 where the sampling frequencies are removed and the analog replica of the input signal supplied to the transmitter of FIG. 1 is provided at output terminal 229.

At the beginning of each horizontal line, the accumulated sum suplied by adding circuit 221 must be adjusted to the average signal value to correspond to the input signal to the transmitter of FIG. 1 at this time. To this end, an average signal battery 230 provides a direct current signal equal to the expected average amplitude of the video signal. This signal is applied by way of AND gate 231 and OR gate 228 to adding circuit 221. The horizontal synchronizing pulse appearing on lead 205 is applied to disable inhibit gate 227 and enable AND gate 231 and thus substitute the average signal from battery 230 for the accumulated sum supplied by delay line 226. At this time, decoder 219 is no longer supplying output samples and hence this average signal value continues to circulate around the loop until the beginning of the next horizontal line.

It will be noted that the horizontal and vertical synchronizing codes have been chosen such that a horizontal synchronizing code appears in the field of the vertical synchronizing code. Thus the horizontal synchronizing pulse appears on output lead 205 at the same time that a vertical synchronizing pulse appears on lead 206.

It can be seen that the transmitter of FIG. 1, in combination with the receiver of FIG. 2, serves to transmit and receive four-digit differential codes representing analog information. These four-digit codes are supplemented by an additional four digits for those sample differences which exceed a preselected threshold. The expanded codes are stored and transmitted during the horizontal retrace time.

It is to be understood that the number of digits shown in FIGS. 1 and 2 are merely illustrative and should not be taken as limiting. For example, a much larger number of digits can be used for the *m*-codes to expand the amplitude range provided by these *m*-codes. At the same time, however, since the horizontal blanking period is fixed in duration, a lesser number of *m*-codes could then be transmitted during this time. One such arrangement will be described in detail in connection with FIGS. 3 and 4.

Figure 3:
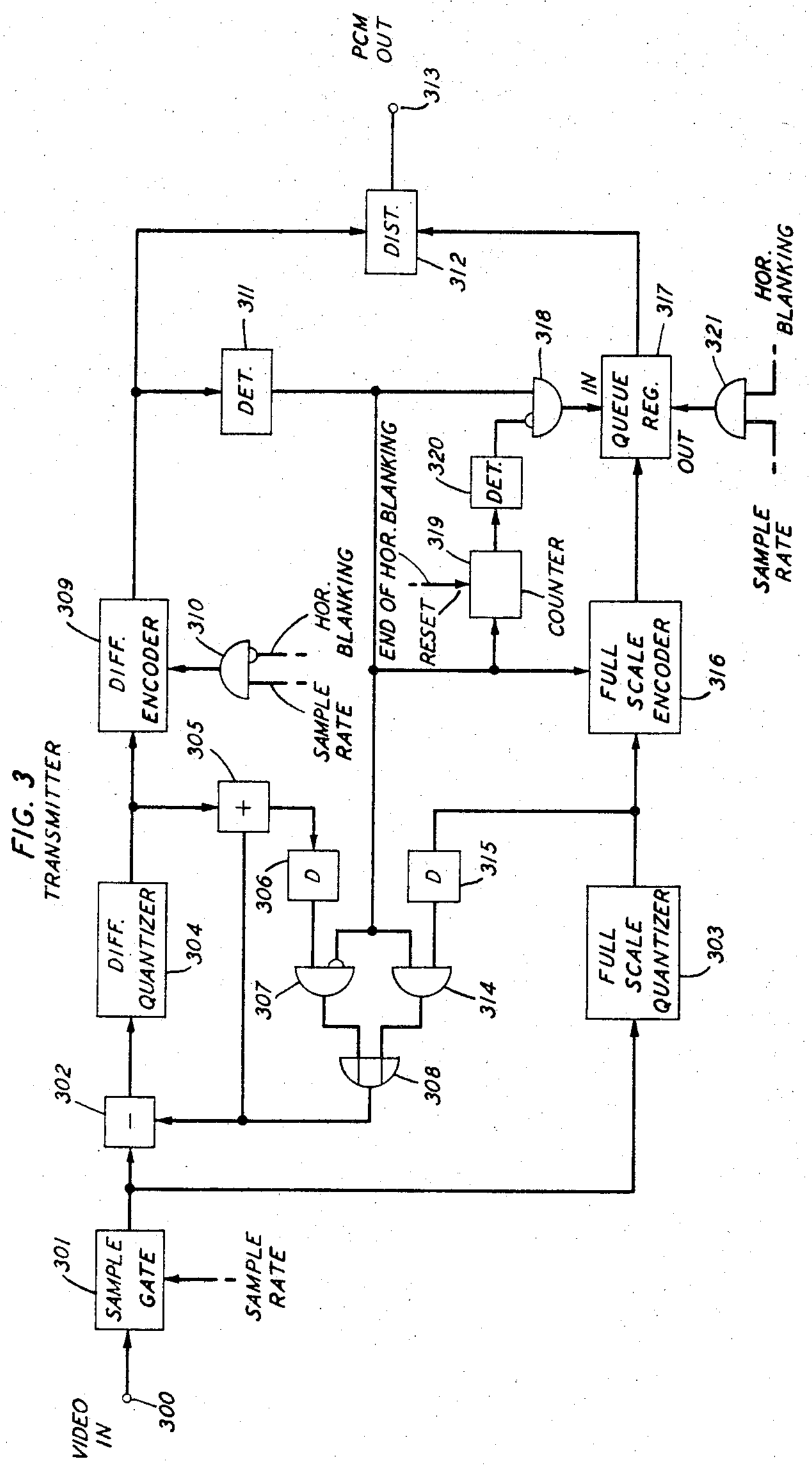
FIG. 3 is a schematic block diagram of the transmitter for a differential-base amplitude split code video transmission system in accordance with the present invention.

Referring then to FIG. 3, there is shown a detailed block diagram of a pulse code modulation transmitter comprising an input terminal 300 to which analog video information is applied. This video signal is applied to sampling gate 301 which is operated at the sampling rate. It will be noted that, in FIG. 3, the source of the various clock pulses has not been shown and may be assumed to be identical to that shown in FIG. 1.

The output of sampling gate 301 is simultaneously applied to analog subtracting circuit 302 and quantizing circuit 303. Analog subtractor circuit 302, like circuit 105 in FIG. 1, derives the algebraic difference between the two signals applied to its input terminals and applies this difference to its output terminal. In FIG. 3, this difference is applied to quantizing circuit 304. The output of quantizing circuit 304 is applied to one input of analog adding circuit 305 which, like circuit 108 in FIG. 1, derives the algebraic sum of the two signals applied to its input terminal and provides this sum on its output terminal. This output is applied to delay line 306.

Delay line 306 has a delay equal to the sampling interval and its output is applied by way of inhibit gate 307 and OR gate 308 to the remaining input of analog subtracting circuit 302 and analog adding circuit 305.

The output of quantizing circuit 304 is also applied to differential encoding circuit 309 which is enabled by means of clock pulses supplied through inhibit gate 310.

It will be noted that clock pulses at the sampling rate are passed by inhibit gate 310 only in the absence of the horizontal blanking pulse. Thus, differential encoder 309 is enabled only during the active line scanning interval. During the horizontal retrace time, encoder 309 is disabled by the horizontal blanking pulse.

The output of differential encoder 309 is similar to, and may be identical with, the *n*-code output of encoder 107 in FIG. 1. That is, the output codes of encoder 309 represent, in coded form, the amplitude and sign of the differential signals applied to its input terminal. When this difference exceeds a preselected threshold, however, encoder 309 produces a unique flag code which can be detected by detector 311. The differential codes from encoder 309 are applied by way of distributing circuit 312 to output terminal 313.

Detector 311, when enabled, provides an output signal which disables inhibit gate 307 and enables AND gate 314. AND gate 314, when enabled, passes a quantized sample from quantizer 303, by way of delay line 315, to one input of analog subtracting circuit 302. Quantizer 303 is arranged to quantize the input samples into discrete levels covering the entire range of the input signal. Quantizer 303 has therefore been termed a "full-scale" quantizer. Delay line 315, like delay line 306, provides a delay equal to the intersample interval. It can therefore be seen that an output signal from detector circuit 311 operates to substitute the output of quantizer 303 for the ouput of adding circuit 305 at the input to subtractor circuit 302. The differential quantizing loop thereafter generates differences based on this substituted value.

The output of quantizer 303 is applied to full-scale encoder 316 which uniquely represents each quantizing level by a pulse code and supplies these pulse codes to queue register 317. Queue register 317, like register 112 in FIG. 1 serves to store pulse codes during the active line scanning interval and to permit the transmission of these codes during the following horizontal blanking period. The output of detector 311 is therefore applied, by way of inhibit gate 318, to allow one code to be registered in queue register 317 from encoder 316. The output of detector 311 is also applied to counter circuit 319 which counts the codes registered in queue register 317 up to the capacity of register 317. When this capacity is reached, detector circuit 320 detects this count and supplies an output to disable inhibit gate 318. Further flag codes are therefore prevented from allowing too many full scale codes to be stored in queue register 317. These codes can, of course, be interpreted as the maximum value on the differential scale. Counter circuit 319 is reset at the end of the horizontal blanking period to prepare for the next active line scanning interval.

The full scale codes stored in queue register 317 are transmitted during the horizontal blanking period in the same order in which they are stored. To this end, sampling pulses are applied by way of AND gate 321 to out-pulse queue register 317. AND gate 321 is enabled only during the horizontal blanking period by means of a horizontal blanking pulse.

It can be seen that the transmitter of FIG. 3 like the transmitter of FIG. 1, serves to transmit differential codes for all differences up to a preselected threshold. For differences above this threshold, the circuit of FIG. 3 transmits a flag code during the active line scanning interval and stores a full scale code representation of the sample producing that difference. At the remote receiver, of course, the full scale code representation is substituted for the accumulated differences and thus permits corrections of accumulated errors at the very sampling interval during which the largest error would otherwise occur. In this way, all the advantages of differential encoding are preserved while the major disadvantages are avoided.

Figure 4:
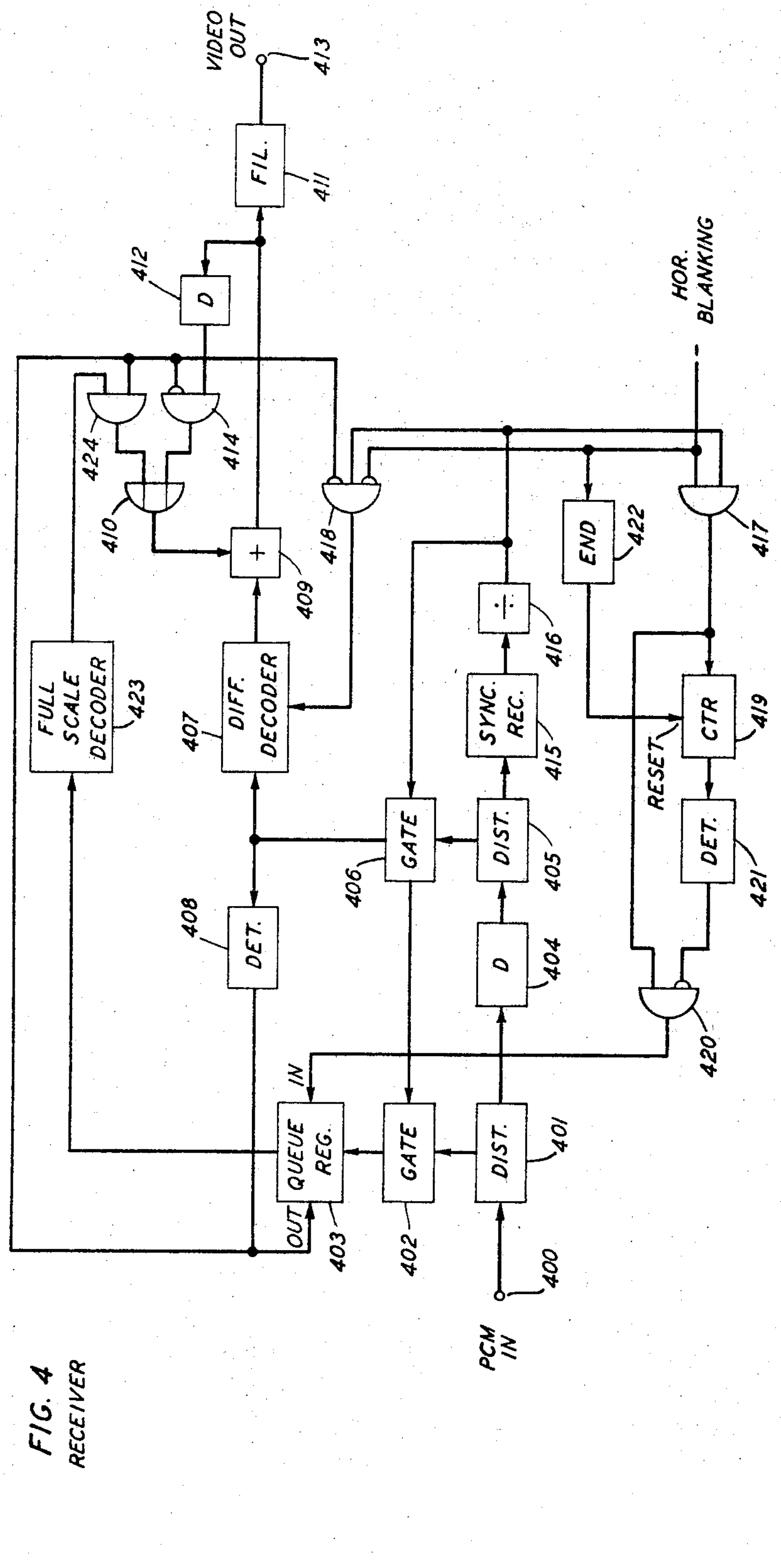
FIG. 4 is a schematic block diagram of a receiver suitable for use with the transmitter of FIG. 3.

Referring then to FIG. 4, there is shown a detailed block diagram of the pulse code modulation receiver suitable for use with the transmitter of FIG. 3. The incoming serial pulse train is applied to input terminal 400 from whence it is applied to distributor 401. Distributor 401 converts successive serial pulse groups into parallel form which are applied by way of gate circuit 402 to queue register 403. The number of digits involved in this serial-to-parallel conversion is equal to the number of digits provided by full scale encoder 316 in FIG. 3. Queue register 403 is therefore enabled during the horizontal retrace period to store full scale codes in the order in which they are received.

After traversing distributor 401, the serial pulse input train is applied to delay line 404 which provides a delay equal to the period required to scan one horizontal line and retrace to the beginning point. The output of delay line 404 is applied to distributor 405 which, like distributor 401, converts the input serial pulse train into parallel groups, each representing a differential code. The differential codes are applied by way of gating circuit 406 to differential decoder 407 and detector 408.

Decoder 407 converts the input pulse code into analog signal samples having a magnitude equal to the number represented by the code. This sample is delivered to analog adding circuit 409. Adding circuit 409 adds each differential sample from decoder 407 to the previously accumulated sum of differential samples supplied from OR gate 410 and delivers this accumulation simultaneously to filter circuit 411 and delay line 412. The output of filter circuit 411 is applied to video output terminal 413.

Delay line 412 has a delay equal to the intersample interval and supplies its output by way of inhibit gate 414 and OR gate 410 to adding circuit 409. Thus, delay line 412 and adding circuit 409 comprises the loop necessary to accumulate successive differential samples.

After traversing distributor 405, the input pulse train is applied to synchronization recovery and framing circuit 415 which generates clock pulses at the input pulse rate and provides the information necessary to frame the input pulse train in the consecutive code groups. This clock pulse train is applied to divider circuit 416 which divides clock pulse trains by the number of pulses in each differential code group.

The output of divider 416 therefore comprises clock pulsed at the sampling rate. These clock pulses are simultaneously applied to gates 402 and 406, AND gate 417, and inhibit gate 418. The horizontal blanking pulse is also applied to fully enable AND gate 417 and disable inhibit gate 418. Thus, in the absence of a horizontal blanking pulse (during the active line scanning period), inhibit gate 418 is fully enabled to pass sampling clock pulses to decoder 407 to permit the decoding of differential codes. During the horizontal blanking period, inhibit gate 418 is disabled and AND gate 417 is enabled to apply sampling clock pulses simultaneously to counter circuit 419 and inhibit gate 420.

When enabled, inhibit gate 420 applies clock pulses to queue register 403 to permit the advancing of full scale codes in the queue register 403 during the horizontal blanking period. Counter circuit 419 counts these pulses and, when the number of pulses passed by AND gate 417 is equal to the capacity of queue register 403, produces an output code which is detected by detector circuit 421. The output of detector 421 disables inhibit gate 420 to prevent the application of any further advancing pulses to queue register 403. At the end of the horizontal blanking period, end-detecting circuit 422 produces an output pulse which is used to reset counter 419 and thus prepare it for the next horizontal blanking period.

The full scale codes stored in queue register 403 during the horizontal blanking period are advanced out of queue register 403 one at a time by the output of detector circuit 408. Detector circuit 408, of course, responds to the presence of a flag code at the output of gate 406. The full scale codes advanced out of queue register 403 are applied to full scale decoder 423. Decoder 423, in turn, generates an analog sample having the magnitude corresponding to the magnitude represented by the full scale code. This sample is applied to AND gate 424.

The output of detector circuit 408 is applied to fully enable AND gate 424 and disable inhibit gate 414, thus substituting the output of decoder 423 for the output of delay line 412. Adding circuit 409 therefore receives this full scale sample instead of the accumulated sum of the previously-received differential samples. At the same time, the output of detector 408 disables inhibit gate 418 to prevent the application of a differential sample by decoder 407 at this time. Hence, the loop comprising delay line 412 and adding circuit 409 now begins to recirculate the full scale sample instead of the accumulated sum of the differential samples. Since any errors in the differential samples themselves are accumulated in this loop, the substitution of the full scale sample serves to correct these accumulated errors. Moreover, since the largest errors occur for the larger values of differential samples, it is for just these larger values that a full scale code is made available.

It can be seen that the transmitter of FIG. 3 and the receiver of FIG. 4 cooperate to provide a differential encoding system which utilizes differential codes for small signal differences. When signal differences exceed a preselected threshold, however, the full scale code sample is transmitted to correct any errors accumulated up to that time and to provide an accurate representation of the signal values following large amplitude changes.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A video transmission system comprising a source of video signals, means for obtaining regularly recurring samples of said video signals, means for differentially encoding and transmitting said samples when said difference is less than a preselected threshold, means for generating and transmitting an identifiable flag signal when said difference is greater than said preselected threshold, means for encoding excess signal differences above said preselected threshold, means for storing said excess signal codes in the order in which they are generated, and means for transmitting said excess signal codes during inactive portions of the scanning cycle of said video signals.

2. The video transmission system according to claim 1 further including means to encode said sample differences below said preselected threshold in a code having a first number of digits, and means for encoding said excess signal differences in a code having a second number of differences.

3. A signal transmission system comprising a signal source, means for deriving groups of regularly recurring samples of said signals separated by inactive intervals, means for transmitting differentially encoded representations of all of said samples in each said group producing a difference less than a preselected threshold, means for transmitting a flag signal for each said sample difference exceeding said preselected threshold, means for storing only the codes of said signals producing one of said flag signals, and means for transmitting said stored codes during said inactive interval.

4. The signal transmission system according to claim 3 further including means for encoding said representations in permutated pulse code groups.

5. The signal transmission system according to claim 3 further comprising means for deriving the difference between each said sample and the accumulated sum of previously generated differences.

6. The signal transmission system according to claim 4 further including a transmission medium, means for applying said transmitted representations to said medium, and means remotely coupled to said medium for reconstructing said signals from said representations.

7. A television transmission system comprising means for generating a sequence of video signal samples from a television signal to be transmitted, said sequence of samples being divided into successive groups of samples separated by inactive signal intervals, means for generating the difference between each said sample and previous sample values, means for marking those samples in each said group producing differences exceeding a preselected magnitude, means for encoding each said unmarked difference, means for generating flag codes for each said marked difference, means for generating expanded codes further defining said marked differences, means for sequentially transmitting said unmarked difference codes and flag codes as they are generated, and means for storing said expanded codes for later transmission during said inactive signal interval.

8. The television transmission system according to claim 7 wherein said means for generating expanded codes comprises means for generating differential code representations of the signal difference exceeding said preselected magnitude.

9. The television transmission system according to claim 7 wherein said means for generating expanded codes comprises means for generating full scale code representations of the signal samples producing said differences exceeding said preselected magnitude.

10. A television transmission system comprising a source of video signals, means for generating a sequence of samples of said signals, means for generating an error signal for each said sample representing the difference between that sample and the predicted value of that sample, each said predicted value representing the accumulated sum of previously generated error signals, means for encoding each error signal below a preselected threshold in a first code, means for generating a unique code group for those error signals exceeding said preselected threshold, means for encoding the error signal in excess of said predetermined threshold in a second code, and means for storing said second codes and transmitting them at the end of said sample sequence.

11. The television transmission system according to claim 10 wherein said sample sequence comprises the active horizontal scanning period of said video signal, and said second codes are transmitted during the inactive horizontal retrace period.

12. The television transmission system according to claim 10 wherein said first code comprises four digit positions, said unique code group comprises one of said four digit codes, and said second code also comprises four digit positions.

13. A television transmission system comprising a source of video signals, means for generating a sequence of samples of said signals, means for generating an error signal for each said sample representing the difference between that sample and the predicted value of that sample, each said predicted value representing the accumulated sum of previously generated error signals, means for encoding each said error signal below a preselected threshold in a first code, means for generating a unique code group for those error signals exceeding said preselected threshold, means for encoding each sample producing an error signal exceeding said preselected threshold in a second code, and means for storing said second codes and transmitting them at the end of said sample sequence.

14. The television transmission system according to claim 13 wherein said sample sequence comprises the active horizontal scanning period of said video signal, and said second codes are transmitted during the inactive horizontal retrace period.

15. The television transmission system according to claim 13 wherein said first code comprises a first number of digit positions, said unique code group comprises one of said first codes, and said second code comprises a second number of digit positions.

References Cited

UNITED STATES PATENTS

| | | | |
|---|---|---|---|
| 2,569,927 | 10/1951 | Gloess et al. | 178—6 |
| 2,681,385 | 6/1954 | Oliver | 179—15.55 |
| 3,026,375 | 3/1962 | Graham | 179—15 |

ROBERT L. GRIFFIN, *Primary Examiner.*

WILLIAM S. FROMMER, *Assistant Examiner.*

U.S. Cl. X.R.

178—6; 179—15; 325—38